L. DUNKELSBERG.
ARTICLE OF MANUFACTURE.
APPLICATION FILED MAR. 13, 1916.
1,207,725.
Patented Dec. 12, 1916.
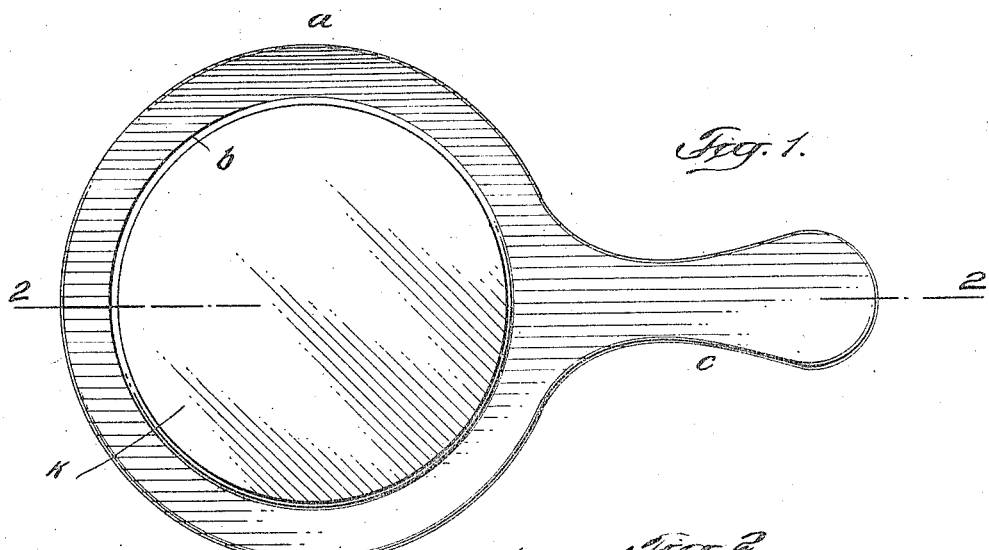
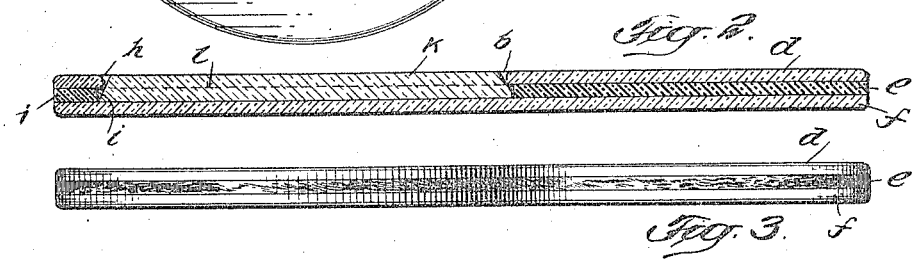
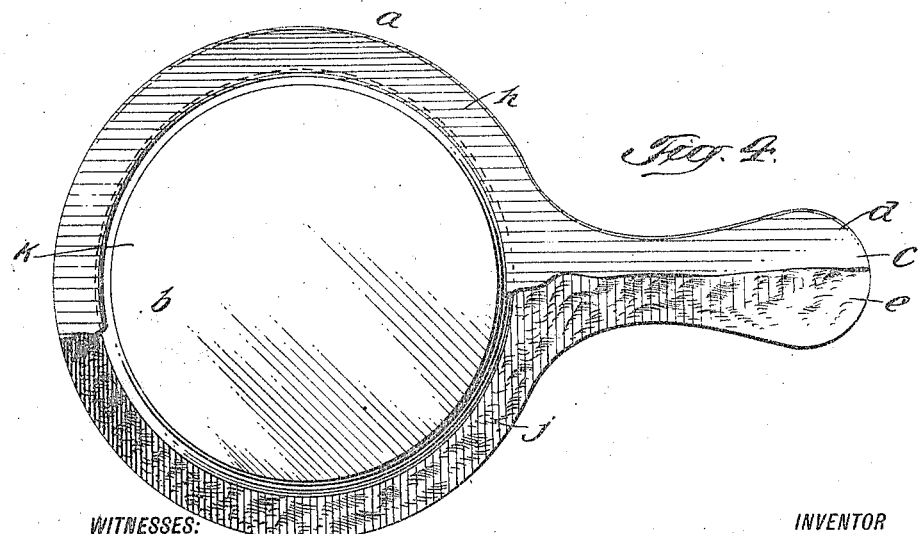
WITNESSES:
INVENTOR
LOUIS DUNKELSBERG
BY
ATTORNEY

UNITED STATES PATENT OFFICE.

LOUIS DUNKELSBERG, OF BROOKLYN, NEW YORK.

ARTICLE OF MANUFACTURE.

1,207,725.  Specification of Letters Patent.  Patented Dec. 12, 1916.

Application filed March 13, 1916. Serial No. 83,932.

*To all whom it may concern:*

Be it known that I, LOUIS DUNKELSBERG, citizen of the United States, and resident of Brooklyn, New York, in the county of Kings and State of New York, have invented a certain new and useful Article of Manufacture, of which the following is a specification.

My invention relates to a new and useful improvement in articles of manufacture, such as handmirrors, and other toilet articles, which are constructed of several layers of material, preferably of celluloid, the middle layer of which is of a different color from the outer layers.

The object of my invention is to construct articles, in which the frame is constructed of three layers of celluloid, the middle layer being of a different color from the upper and lower layer, all of the same outward form, all held together with a suitable cement or by other means, so that the edges of the articles, will expose the color of the middle layer, and thus produce a very neat article of great strength and durability.

In forming the mirror, the top layer is constructed from one sheet of celluloid, cut in the from shown in Figures 1 and 4 of the drawings, in which the round section forms the mirror holder while the narrow part forms the handle. The middle layer is of the same form, but is provided with an opening, of a diameter to receive the mirror, while the lower layer is of the same form, but the opening is of a lesser diameter, in order that it will overlap the opening of the middle layer, and thus form means of holding the mirror in position, while the edges of the articles will expose the middle layer in its various colors.

In the accompanying drawings Fig. 1 is a plan view; Fig. 2 is a cross section of the three layers when fully assembled; in which the bottom layer shows one continuous section, while the middle layer shows a section cut out to provide an opening of sufficient diameter to receive the mirror plate and the upper layer shows a section cut out to form an overlapping rim to hold the mirror in place, the opening being about one-quarter inch less in diameter than the opening in the middle layer; Fig. 3 is a side view showing the edge of Fig. 1; Fig. 4 is a top view with a section cut away on the lines 2—2 of Fig. 1 to show the middle layer, which may be of variegated color, but which only is exposed at the edges of the article.

The three layers of the handmirror shown, are each stamped or cut from a sheet of celluloid of any desirable thickness, preferably in the form *a* shown in Fig. 1, in which the lower layer *f* is of one continuous piece, while the mirror holding end *b* of the middle layer *e*, Fig. 2 has a section *l* cut away, to form a round opening to receive a mirror plate *h* of the same diameter as the opening *i* in the middle layer *e*. The top layer *d* is of the same form and size except that the opening *b* is of a smaller diameter in order that its rim *h* will overlap the mirror edges and firmly hold the mirror in place.

I do not confine myself to the particular forms shown in the drawings 1 to 4 of the mirror, in which the mirror end is shown of round form, nor do I confine myself to the articles shown in the drawing, since other forms may be employed.

It is obvious that other articles may be constructed from the described arrangement of celluloid sheets arranged in layers as above described, and then cemented together such as jewel and other boxes, manicure or toilet articles, may be arranged that the middle layer may be exposed, the chief object being to produce articles of celluloid that will show a middle layer of different color.

Having described my invention, I claim:

1. A new article of manufacture, comprising a frame formed of three layers cut or stamped from sheet celluloid, the lower layer being of one solid continuous piece, a middle and upper layer each having an opening therein, the opening in the upper layer being of less diameter than the opening in the middle layer, all of the said layers being cemented together, and each layer forming a portion of an integral handle to the said frame.

2. As a new article of manufacture, a frame for hand-mirrors, comprising three layers cut or stamped from sheet celluloid, a lower layer formed of one solid continuous piece adapted to support a mirror, a middle layer of different shades of celluloid provided with an opening to receive the mirror, and an upper layer having an opening of less diameter than the opening in the middle layer, all of the said layers being firmly secured together, and each layer forming a portion of an integral handle to the said frame, whereby the entire outer edges of the frame will expose the middle layer in its various colors.

Signed at New York city in the county of New York and State of New York this 10th day of March A. D. 1916.

LOUIS DUNKELSBERG.

Witnesses:
 HENRY H. KNIEDER,
 BEATRICE ROSENBERG.